July 15, 1924.

K. I. LINDSTRÖM ET AL 1,501,408

PULSATOR FOR MILKING MACHINES

Filed May 22, 1922

Inventors:-
K. I. Lindström.
S. A. E. Sterner
By Marks Clark
Att'ys

Patented July 15, 1924.

1,501,408

UNITED STATES PATENT OFFICE.

KNUT IVAR LINDSTRÖM AND SIMON AXEL EFRAIM STERNER, OF DJURSHOLM, SWEDEN.

PULSATOR FOR MILKING MACHINES.

Application filed May 22, 1922. Serial No. 562,895.

*To all whom it may concern:*

Be it known that we, KNUT IVAR LINDSTRÖM and SIMON AXEL EFRAIM STERNER, subjects of the King of Sweden, residing at Djursholm, Sweden, have invented a new and useful Pulsator for Milking Machines, of which the following is a specification.

The present invention refers to such pulsators for milking machines operating with a vacuum which are provided with valves controlled by diaphragms, such valves causing a vacuum to be produced alternately with atmospheric pressure in the teat cups.

The invention is principally characterized by the fact that the reversal of the valves from the one position to the other is effected by the expansion of the air, without the medium of resilient means, and also by the fact that the pulsator is provided with two pairs of valves rigidly and immovably attached in relation to each other onto a common spindle, and further by the fact that the area of that valve in each pair of valves which controls the supply of vacuum is larger than the area of the corresponding valve controlling the supply of atmospheric air.

Figure 2:
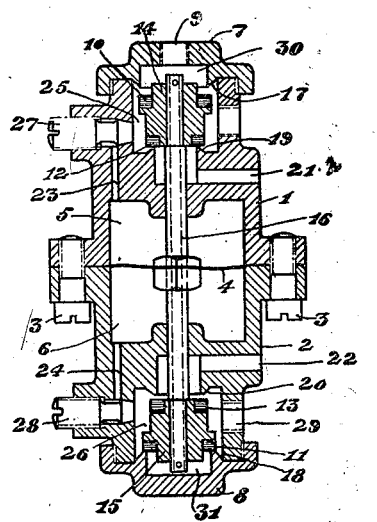
Figure 1:
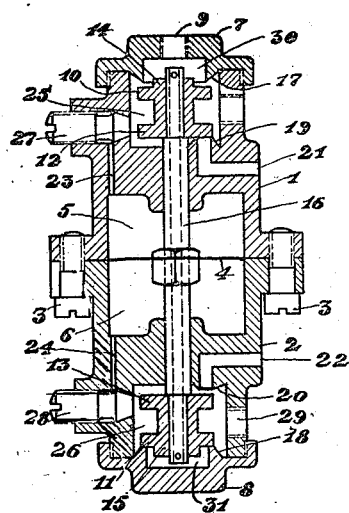

The Figures 1 and 2 of the accompanying drawing illustrate two embodiments of the invention.

According to the drawing, the pulsator is composed of two halves 1 and 2, held together by means of the screws 3. Between the halves 1 and 2 there is a space which is divided in two chambers 5 and 6 by the diaphragm 4 which is jammed between the parts 1 and 2. The outer ends of the halves 1 and 2 form together with the covers 7 and 8 screwed thereon the valve chambers 25 and 26 for the two pairs of valves 14 and 15. The one cover 7 is provided with an opening 9 for a tubing socket affording connection with the vacuum conduit by means of a rubber tubing, not shown in the drawing. The two valves 10 and 12 or 11 and 13 respectively of each pair of valves are arranged on one and the same valve body 14 or 15 respectively. These two valve bodies are rigidly attached to either end of a tubular spindle 16 extending through the diaphragm 4, and are retained thereon by means of nuts. The spindle is movable in its longitudinal direction, and the ends thereof open underneath the covers 7 and 8. The valve seats 17 and 18 for the vacuum valves 10 and 11 are arranged on the inner sides of the covers and the valve seats 19 and 20 for the fresh-air valves 12 and 13 are provided on the halves 1 and 2.

These parts 1 and 2 are provided partly with passages 21 and 22 for the supply of air under atmospheric pressure, and partly with passages 23 and 24 connecting the valve chambers 25 and 26 with the chambers 5 and 6 respectively, on either side of the diaphragm. In one place between the valves 10 and 12, the chamber 25 is connected with the passage 23 by means of a conical opening adapted to be throttled by means of the regulating screw 27. A corresponding arrangement is provided for connection between the valve chamber 26 and the passage 24 controlled by the regulating screw 28. 29 are openings for tubing sockets adapted to receive the rubber tubings connecting the pulsator with the teat cups. The striking surfaces of the vacuum valves 10 and 11 are considerably greater than the striking surfaces of the fresh-air valves 12 and 13. On account of the fact that both valve pairs are rigidly and immovably connected with one another, the fresh-air valves will be pressed firmly onto their valve seats when the co-operating vacuum valves are sucked to their valve seats, and when the vacuum valve is moved off its valve seat through the action of the diaphragm, the fresh-air valve is at the same time loosened from its valve seat. By this means an instantaneous reversal is attained through the expansion of the air, which constitutes the characteristic feature of the present invention.

The difference between the two embodiments shown in Figs. 1 and 2 is to be found in the way the respective valve seats are arranged. While in Fig. 1 the valve seats are disposed laterally of the central spindle 16, Fig. 2 shows the valve seats as being arranged concentrically about the central spindle.

The pulsator according to the invention operates in the following manner:

In the position shown in the drawing, vacuum prevails in the valve chamber 25, the chamber 6 and the part 31 of the valve chamber 26, while at the same time atmospheric air pressure is prevailing in the valve chamber 26 and the chamber 5. Thus the vacuum valve 15 is being sucked onto its seat, whereby the fresh-air valve 12 is also pressed onto its seat, thereby cutting off the admission of the atmospheric air from the pulsator. Depending on the degree of throttling by means of the regulating screws 27 and 28, vacuum or fresh air respectively is conducted at a higher or lower rate from the valve chamber 25 or 26 respectively, to the corresponding chambers 5 and 6. Through this the diaphragm is pressed upwards from the position shown in the drawing. When the pressure on the lower side of the diaphragm overweighs the vacuum sucking the valve 11 against its seat, the valve will be jerked loose, and through the expansion of the air enclosed within the chamber 6 which, as is understood, has a pressure exceeding the partial vacuum in the chamber 5, the valve spindle will be instantaneously thrown over together with its two pairs of valves into the opposite extreme position, after which the cycle of operations above described will be repeated. As will be found from the foregoing, the pulsator construction according to the present invention is distinguished in that it possesses only one movable part 16, and by the fact that the valves do not slide on the spindle, thus preventing wear and leaks involved thereby, and, finally, by the fact that all resilient devices for the reversal of the valves are eliminated, whereby greater safety in operation and reduced manufacturing costs will be attained.

What we claim is:

1. In pulsators for milking machines operating with vacuum, the combination of two pairs of valves which are rigidly mounted on a common body, movable longitudinally, means for giving said body and the valves a reciprocating movement, said means consisting of a vibratory diaphragm, connected with the valves, the one valve in each pair serving to control the vacuum supply, and the other to control the supply of atmospheric air, the atmospheric pressure valve in the one pair and the vacuum supply pipe in the other pair being adapted to occupy the closed position simultaneously.

2. In pulsators for milking machines operating with vacuum, the combination of two pairs of valves which are mechanically connected so as to move together, the one valve in each pair serving to control the vacuum supply, and the other to control the supply of atmospheric air, means for giving said valves a reciprocating movement, said means consisting of a vibratory diaphragm, connected with the valves, the one pair of valves being located on the one side of the diaphragm and the other pair of valves on the opposite side thereof.

3. In pulsators for milking machines operating with vacuum, the combination of two pairs of valves which are rigidly mounted on a common body, movable longitudinally, means for giving said body and the valves a reciprocating movement, said means consisting of a vibratory diaphragm, connected with the said body, the one valve in each pair serving to control the vacuum supply, and the other to control the supply of atmospheric air, all the valves being arranged co-axially, the atmospheric pressure valve in the one pair and the vacuum valve in the other pair being adapted to occupy the closed position simultaneously.

4. In pulsators for milking machines operating with vacuum, the combination of two pairs of valves which are rigidly mounted on a common spindle, movable longitudinally, means for giving said spindle and the valves a reciprocating movement longitudinally, the one valve in each pair serving to control the vacuum supply, and the other to control the supply of atmospheric air, said spindle being formed as a tube, through which the housing for the one vacuum valve and the housing for the other vacuum valve communicate with each other.

5. In pulsators for milking machines operating with vacuum, the combination of two pairs of valves, which are mechanically connected so as to move together, means for giving the valve pairs a reciprocating movement, said means consisting of a vibratory diaphragm connected with the valves, the one valve in each pair serving to control the vacuum supply, and the other to control the supply of atmospheric air, the atmospheric pressure valves having a smaller area, than the vacuum valves.

6. In pulsators for milking machines operating with vacuum, the combination of two pairs of valves, which are mechanically connected so as to move together, means for giving the valve pairs a reciprocating movement, said means consisting of a vibratory diaphragm connected with the valves, the one valve in each pair serving to control the vacuum supply, and the other to control the supply of atmospheric air, the atmospheric pressure valves having a smaller area, than the vacuum valves, which latter have a smaller area than the diaphragm, the one pair of valves being located on the one side of the diaphragm and the other pair of valves on the opposite side thereof.

7. In pulsators for milking machines operating with vacuum, the combination of two pairs of valves, which are mechanically connected so as to move together, means for giving the valve pairs a reciprocating movement, said means consisting of a vibratory diaphragm connected with the valves, the one valve in each pair serving to control the vacuum supply, and the other to control the supply of atmospheric air, means for causing the vacuum pressure to set in full extent, on the one side of the diaphragm, simultaneously as a reduced atmospheric pressure acts on the other side of the diaphragm, and for causing the atmospheric pressure to act in full extent on the one side of the diaphragm simultaneously as a reduced vacuum pressure acts on the other side of the diaphragm.

8. In pulsators for milking machines operating with vacuum, the combination of two pairs of valves, which are arranged coaxially to each other and further are connected rigidly so as to move together, means for giving the valve pairs a reciprocating movement, said means consisting of a vibratory diaphragm, connected with the valve, the one valve in each pair serving to control the vacuum supply, and the other to control the supply of atmospheric air, means for causing the vacuum pressure to act in full extent, on the one side of the diaphragm, simultaneously as a reduced atmospheric pressure acts on the other side of the diaphragm, and for causing the atmospheric pressure to act in full extent on the one side of the diaphragm simultaneously as a reduced vacuum pressure acts on the other side of the diaphragm, the one pair of valves being located on the one side of the diaphragm and the other pair of valves on the other opposite side thereof.

9. In pulsators for milking machines operating with vacuum, the combination of a casing, a chamber in said casing, a vibratory diaphragm dividing said chamber in two chambers, two other chambers in said casing, said chambers being arranged at each side of the first chamber, a spindle extending through all the said chambers, and movable longitudinally, two pairs of valves, arranged respectively in the two latter chambers, the one valve in each of these chambers serving to control the vacuum supply and the other to control the supply of atmospheric air, all the valves and the diaphragm being attached to the spindle.

10. In pulsators for milking machines operating with vacuum, the combination of a casing, a chamber in said casing, a vibratory diaphragm dividing said chamber in two chambers, two other chambers in said casing, said chambers being arranged at each side of the first chamber, a spindle extending through all the said chambers, and movable longitudinally, two pairs of valves arranged respectively in the two latter chambers, the one valve in each of these chambers serving to control the vacuum supply and the other to control the supply of atmospheric air, an inlet for the atmospheric air to each of said chambers, the walls between the chambers serving as a guide for the said spindle, the inner opening of each air inlet channel being closed from communication with the play between the spindle and its guide, when the corresponding air inlet valve is in the closed position, all the valves and the diaphragm being attached to the spindle.

In witness whereof we have hereunto set our hands in the presence of two witnesses.

KNUT IVAR LINDSTRÖM.
SIMON AXEL EFRAIM STERNER.

Witnesses:
 ERIC HALGE,
 L. BERG VON LINDE.